United States Patent [19]

Aubin et al.

[11] Patent Number: 4,844,309
[45] Date of Patent: Jul. 4, 1989

[54] A.T.V. CARRY ALL

[76] Inventors: Ronald P. Aubin, #139, 10035 - 184 Street, Edmonton, Alberta, Canada, T5S 1B6; Laurent M. Aubin, 10212 - 54 Street, Edmonton, Alberta, Canada, T6A 2H5

[21] Appl. No.: 103,749

[22] Filed: Oct. 2, 1987

[51] Int. Cl.$^4$ ............................................. B60R 7/00
[52] U.S. Cl. ............................... 224/273; 206/541; 220/20; 224/32 R; 224/42.44
[58] Field of Search .............. 206/315.11, 315.1, 549, 206/548, 541, 570; 220/20, 23.4, 23.8; 224/31, 32 R, 32 A, 42.03 R, 42.03 A, 42.03 B, 273, 275, 311, 42.44; 280/289 A, 289 L, 769

[56] References Cited

U.S. PATENT DOCUMENTS

| | | | |
|---|---|---|---|
| 3,061,136 | 10/1962 | Sterngart | 220/23.8 X |
| 3,378,134 | 4/1968 | Wilkinson et al. | 220/20 |
| 3,625,405 | 12/1971 | Kezar et al. | 224/32 A |
| 3,648,830 | 3/1972 | Graf | 220/23.4 X |
| 3,687,344 | 8/1972 | Nixon | 224/273 |
| 3,788,532 | 1/1974 | Bish | 224/31 |
| 3,873,010 | 3/1975 | Patterson | 224/275 |
| 4,059,207 | 11/1977 | Jackson et al. | 224/32 R X |
| 4,260,085 | 4/1981 | Jefferson | 224/32 R |
| 4,266,703 | 5/1981 | Litz | 224/32 A |
| 4,277,008 | 7/1981 | McCleary | 224/273 |
| 4,300,706 | 11/1981 | Hendrick et al. | 224/31 |
| 4,522,420 | 6/1985 | Hannappel | 280/289 A |
| 4,588,114 | 5/1986 | Lebaron et al. | 224/32 A |

Primary Examiner—J. R. Scott
Attorney, Agent, or Firm—Fleit, Jacobson, Cohn & Price

[57] ABSTRACT

A lightweight parallelepiped hollow housing is provided for mounting upon the load rack of an A.T.V. and includes front-to-rear extending and transversely spaced partitions therewithin dividing the interior of the housing into center and opposite side compatrments, center and opposite side openings being formed in the front wall of the housing opening into the center and side compartments. A pair of hinged closures close the opposite side openings and a central backrest closes the center opening. The housing includes a back wall having an upper central opening formed therein providing access to the center compartment and a forwardly opening hinged cover is swingable into position overlying at least the upper portion of the rear wall and defines an openable compartment rearwardly of the rear wall.

7 Claims, 3 Drawing Sheets

A.T.V. CARRY ALL

BACKGROUND OF THE INVENTION

1. Field of the Invention

All Terrain Vehicles (A.T.V.) are becoming increasingly popular and are used for long distance off-road camping trips and the like. This invention relates to a housing for support from the rear of an A.T.V. and designed to enclose various forms of camping, hunting and fishing equipment and additional structure is provided for supporting an exterior fuel container therefrom.

2. Description of Related Art

Various different forms of luggage and equipment carriers for motorcycles, snowmobiles and all terrain vehicles heretofore have been provided such as those disclosed in U.S. Pat. Nos. 3,625,405, 3,687,344, 3,788,532, 4,260,085, 4,266,703, 4,277,008, 4,522,420 and 4,588,114. However, these previously known forms of carriers do not include the number of multiple compartments of the instant invention which may be separately opened for individual access thereto during inclement weather and do not include an exterior compartment for containing articles which a person may wish to use before reaching his camping destination and which are therefore readily available independent of gaining access to any of the interior compartments of the carrier.

SUMMARY OF THE INVENTION

This invention relates to an equipment carrier for use on a A.T.V. and which is designed to be removably strapped thereon and includes structure operative to prevent shifting of the carrier relative to the associated A.T.V., even though the method of attachment of the carrier to the vehicle is by adjustable straps.

The main object of this invention is to provide a carrier for uses on an A.T.V. and which defines a plurality of interior compartments each having a separate closure therefor.

Another object of this invention is to provide a carrier which may be readily supported from and anchored relative A.T.V's of different manufacture.

Yet another important object of this invention is to provide an equipment carrier in accordance with the preceding objects and which includes a closable exterior compartment for containing equipment to which access may be desired before reaching a predetermined camping location.

Another very important object of this invention is to provide a carrier of lightweight construction and yet which may be utilized to support a reasonably heavy load and with the carrier mounted relative to a load carrier or rack of an A.T.V. merely through the utilization of attaching straps and brackets specifically designed to prevent shifting of the carrier relative to the supporting A.T.V. rack or carrier.

Still another object of this invention is to provide an equipement carrier for an A.T.V. which may be used as a back rest for the seat of the associated A.T.V.

A final object of this invention to be specifically enumerated herein is to provide an equipment carrier for an A.T.V. and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
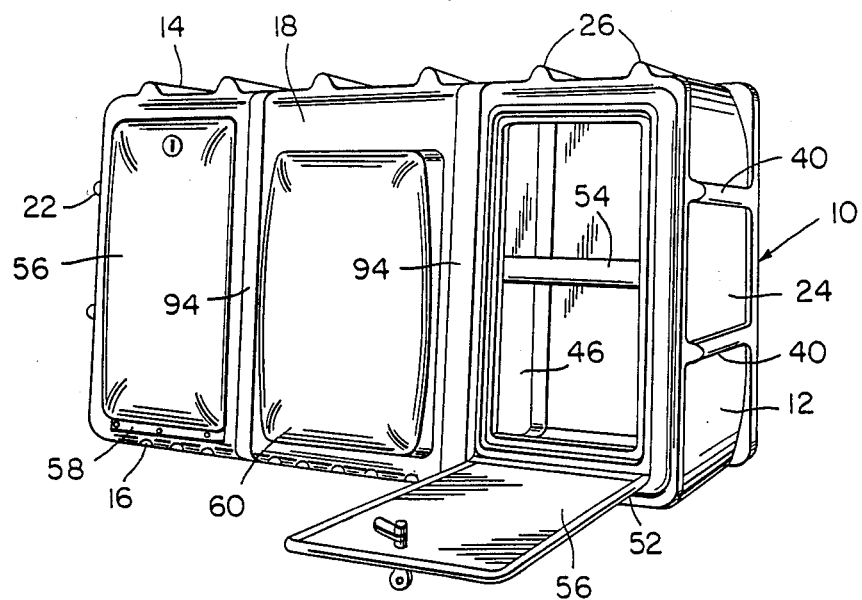
FIG. 1 is a front elevational view of the carrier of the instant invention with one of the lockable closure doors for the two side compartments of the carrier shown in an open position.

Referring now more specifically to the drawings, the numeral 10 generally designates the carrier or carry-all of the instant invention. The carrier 10 includes a generally parallelepiped hollow housing 12 constructed of plastic or other suitable material and including interconnected top and bottom walls 14 and 16, front and rear walls 18 and 20 and opposite side walls 22 and 24. The top wall 14 is provided with front-to-rear extending ribs 26, the bottom wall 16 is corrugated as at 28, the front wall 18 is provided with a center opening 30 and opposite side openings 32 bounded by reinforcing channels 34 and 36 and the opposite side walls 22 and 24 are ribbed as at 38 and 40, all providing additional strength to the various walls. Further, the rear wall 20 includes outer marginal reinforcing 42.

The interior of the housing 12 includes a pair of mirror image upstanding partitions 44 and 46 extending between the walls 14, 16, 18 and 20 on opposite sides of the opening 30 and between the opening 30 and the openings 32. The partitions 46 may be secured in position in any convenient manner (not shown).

The partitions 44 and 46 thereby define a center compartment 48 inward of the opening 30 and opposite side compartments 50 and 52 on the opposite sides of the compartment 48. The compartments 50 and 52 each have a mid-height tray-type shelf 54 disposed therein and secured in desired position by any suitable means (not shown). Accordingly, the compartments 50 and 52 are divided into upper and lower compartment sections by the shelves 54.

Each of the compartments 50 and 52 is provided with a hinged and lockable closure 56 which may be swung downwardly toward an open position, each of the closures 56 being hingedly mounted from the housing 12 through the utilization of a piano hinge 58, see FIG. 1. In addition, the center compartment 48 is semi-permanently closed by a padded backrest 60 secured over the opening 30.

The rear wall 20 includes rearwardly projecting opposite side marginal flanges 64 and a lower rearwardly projecting flange 66. A forwardly opening and rearwardly and downwardly swingable cover 68 is hingedly supported from the lower flange 66 by a piano-type hinge 70 and the cover 68 defines a further rear compartment 72 therein within the boundaries of the flanges 64 and 66. The compartment 72 includes support structure 74 and 76 on the exterior surface of the rear wall 20 for supporting various different pieces of equipment such as an ax 78 and a fishing rod 80.

Further, the rear wall 20 includes an upper central opening 82 formed therein through which access may be had to the center compartment 48 after the cover 68 has been swung downwardly to the open position. Also, the rear central portion of the cover 68 includes a rearwardly opening recess 84 in which a one-gallon container 86 of fuel for the associated A.T.V. may be received and secured in position through the utilization of tension members 88 anchored relative to the container 86 and a suitable hook or other anchor 90 carried on the exterior of the upper portion of the cover 68.

Figure 2:
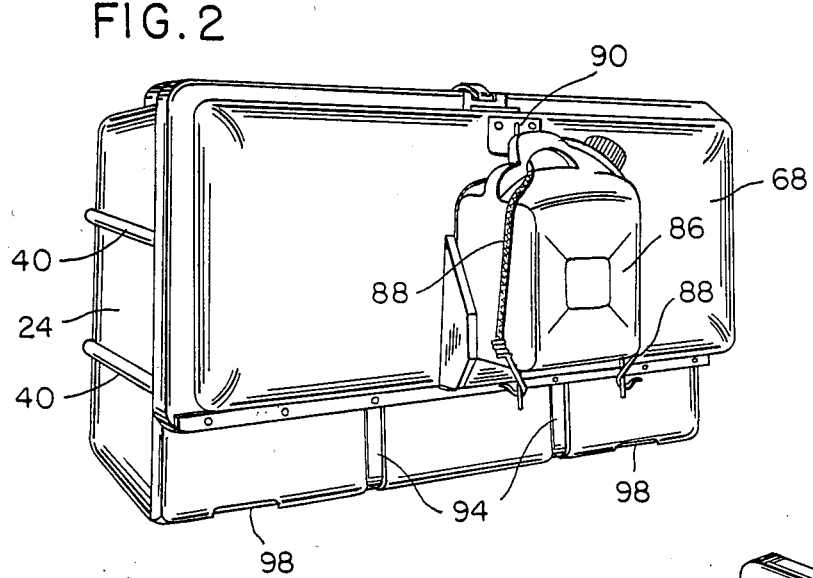
FIG. 2 is a rear perspective view of the carrier with the rear cover in a closed position and a container for fuel supported from the cover on the exterior thereof.
Figure 8:
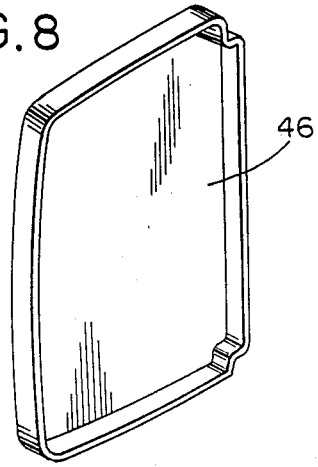
FIG. 8 is a perspective view of one of the vertical partitions of the housing portion of the carrier.
Figure 9:
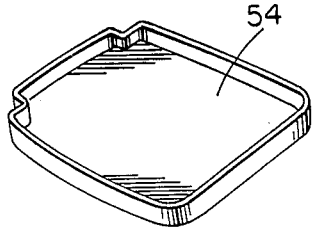
FIG. 9 is a perspective view of one of the shelf members of the housing portion of the carrier.
Figure 10:
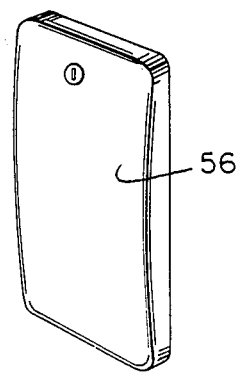
FIG. 10 is a perspective view of one of the closures provided for each of the side compartments of the carrier.
Figure 3:
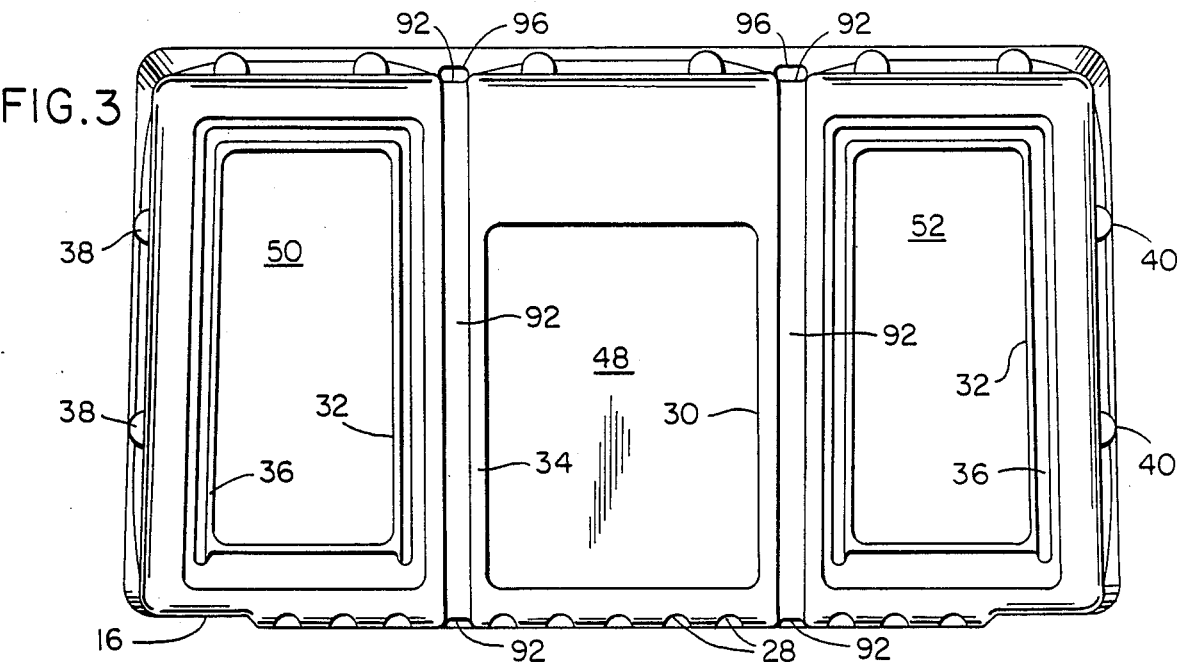
FIG. 3 is a front elevational view of the bare housing portion of the carrier.
Figure 4:
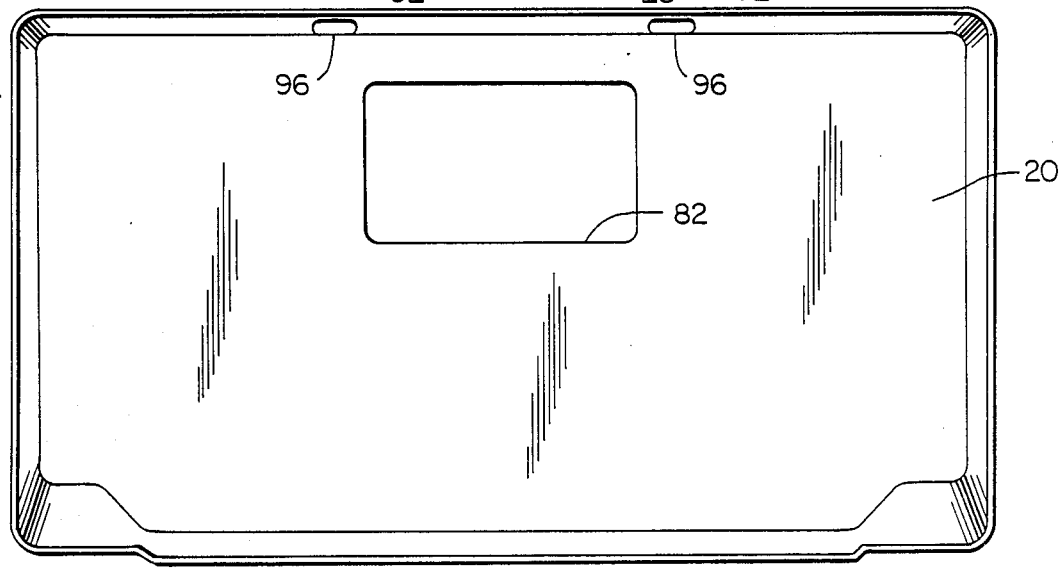
FIG. 4 is an inside elevational view of the rear wall of the housing.
Figure 5:
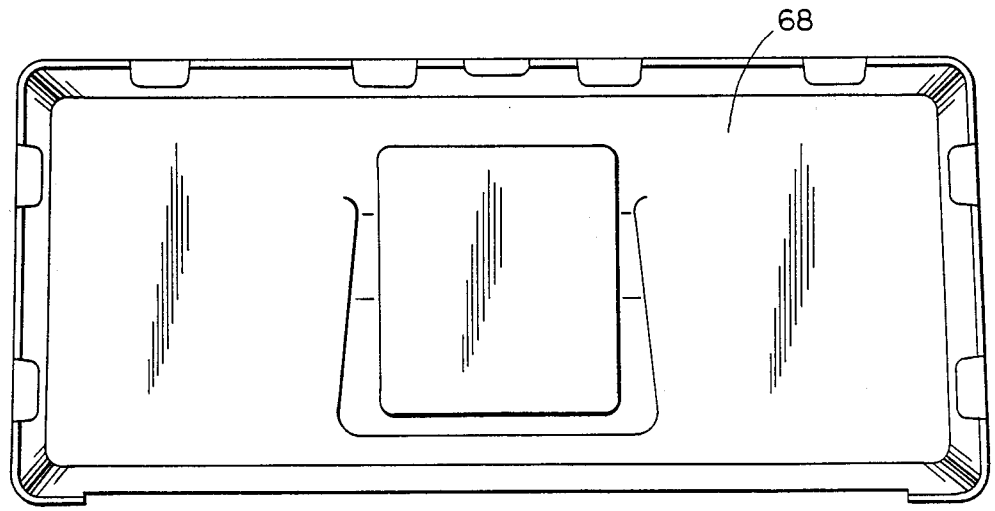
FIG. 5 is an inside elevational view of the rear cover for the housing.

The top wall 14, bottom wall 16 and front wall 18 include pairs of communicated grooves 92 formed therein, see FIG. 3, and a pair of adjustable length straps 94, see FIG. 1, are stabilized within the grooves 92 and are received through openings 96 formed in the upper marginal portion of the rear wall 20, see FIGS. 3 and 4. The straps 94 may be used to strap the carrier 10 to a load rack or the like mounted on the rear of the associated A.T.V. and brackets 98 are secured in recesses provided therefor in the rear margin of the bottom wall 16, see FIG. 2, and include downward projections which engage the aforementioned rack in order to prevent slippage of the carrier 10 relative thereto.

Figure 6:
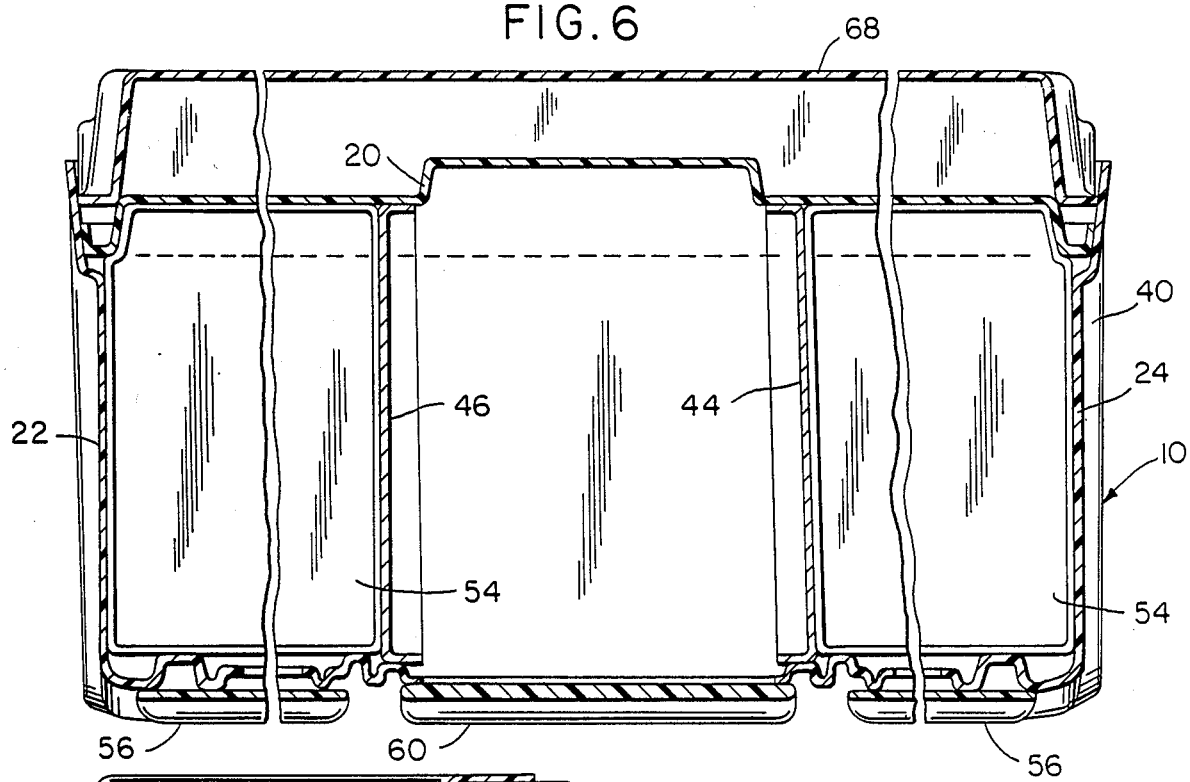
FIG. 6 is a fragmentary enlarged horizontal sectional view of the carrier.
Figure 7:
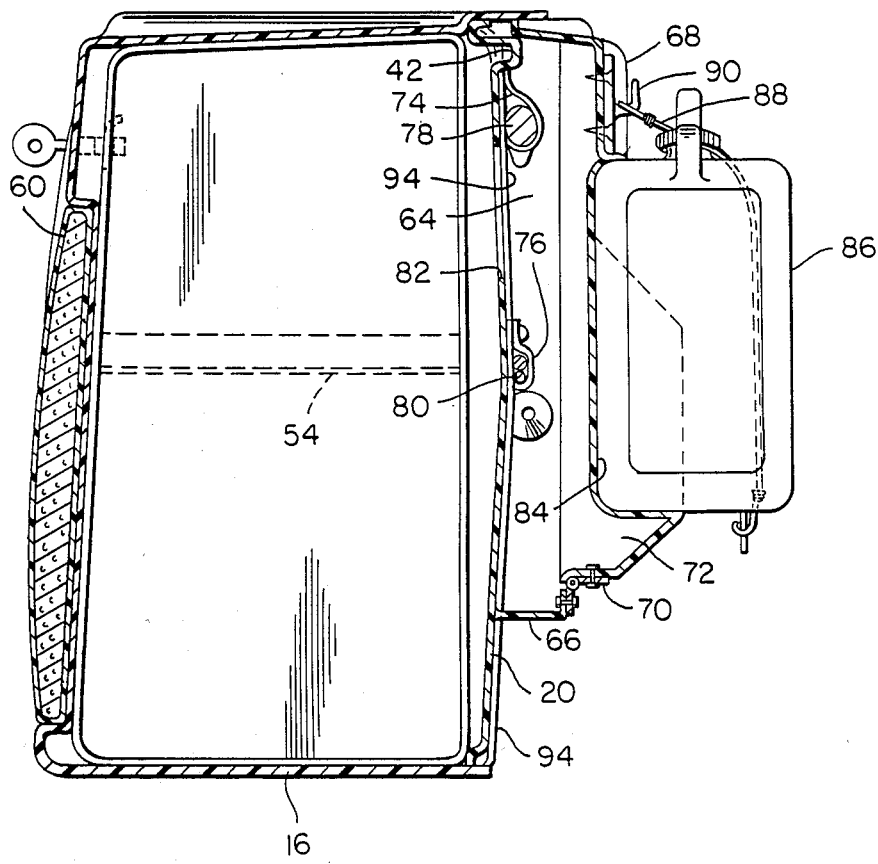
FIG. 7 is an enlarged vertical sectional view of the carrier taken substantially upon a plane space centrally intermediate the opposite sides thereof.

The rear wall 20 may be secured in position through the utilization of any suitable anchoring means (not shown) and it will be noted from FIGS. 6 and 7 that the rear wall 20 is partially telescoped within the rear of the housing 12, thereby precluding the possibility of water being blown into the housing from the front end thereof. In addition, the grooves 34 and 36 about the openings 30 and 32 tend to prevent the entrance of water into the compartments 48, 50 and 52.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A carry-all for use on an A.T.V. or other similar vehicle, said carry-all including a generally parallelepiped hollow housing incorporating interconnected front, rear, top, bottom and opposite side walls, said front wall including a center opening and a pair of opposite side openings transversely spaced apart along said front wall and formed therethrough, a pair of upstanding partition walls extending and secured between said top, bottom, front and rear walls on opposite sides of said center opening and between said center opening and said opposite side openings dividing the interior of said housing into a center compartment and a pair of opposite side compartments, a pair of closures removably secured in position closing said opposite side openings, a padded backrest closing said center opening, a forwardly opening rear cover removably secured over at least a major upper portion of said rear wall and defining a rear compartment between the inner surface of said rear cover and the outer surface of said rear wall major portion, and an upper central opening formed in said major upper portion of said rear wall providing access to the interior of said central compartment of said housing disposed between said partition walls.

2. The carry-all of claim 1 wherein the exterior surface of said rear wall includes means for removably supporting articles therefrom, within said rear compartment.

3. The carry-all of claim 2 wherein the central area of said rear cover includes a rearwardly opening recess formed therein in which a fuel container may be partially received.

4. The carry-all of claim 1 wherein said rear wall includes opposite side marginal portions and a lower portion thereof spaced above the lower margin of said rear wall equipped with interconnected opposite side and lower rearwardly projecting flanges defining a rearwardly opening compartment rearward of said rear wall, said rear cover comprising an openable closure for said rearwardly opening compartment.

5. The carry-all of claim 4 wherein the exterior surface of said rear wall includes means for removably supporting articles therefrom, within said rear compartment.

6. The carry-all of claim 4 wherein said top wall, front wall and bottom wall each defines a pair of outwardly opening grooves extending thereacross with said front wall grooves extending between and forming continuations of the forward ends of said top and bottom wall grooves, said rear wall including an upper marginal portion having a pair of openings formed therethrough registered with the rear ends of the grooves in said top wall, and a pair of attaching straps seated in and stabilized within said grooves and passed through said openings, said straps being adjustable in length and passing over the outer surface of said rear wall.

7. The carry-all of claim 1 including horizontal shelves secured across intermediate height portions of said opposite side compartments.

* * * * *